Oct. 5, 1965  C. H. KRAMP ETAL  3,209,436
METHOD OF FUSING A CONTACT ONTO A SEMI-CONDUCTIVE BODY
Original Filed Jan. 23, 1959  4 Sheets-Sheet 1

INVENTORS
CARL HEINRICH KRAMP
HORST W. KUTSCHERA
BY
AGENT

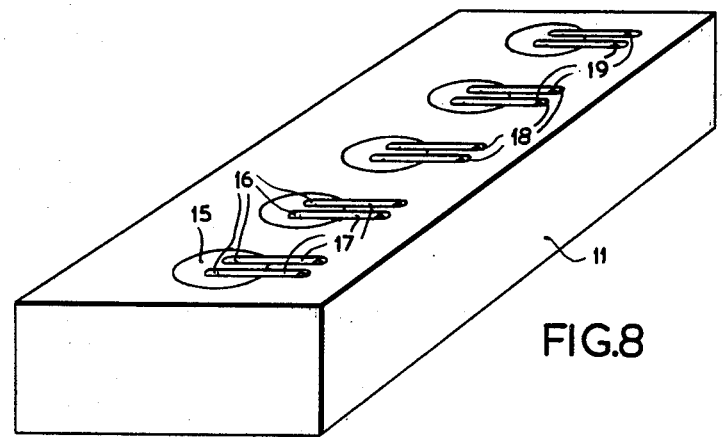
FIG.8
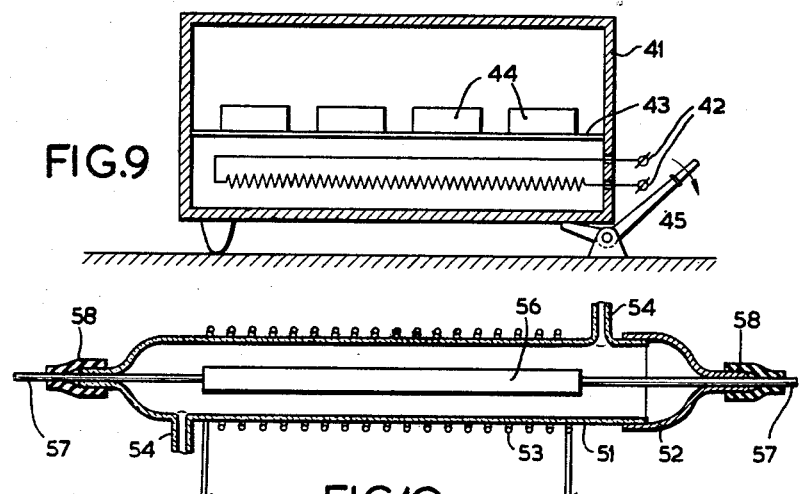
FIG.9
FIG.10
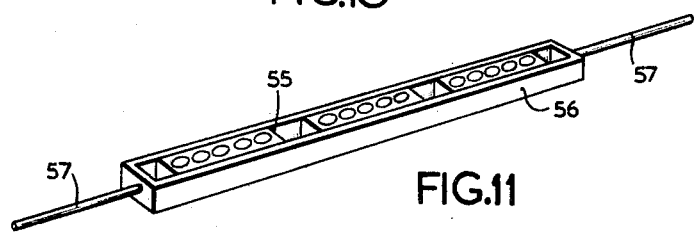
FIG.11

Oct. 5, 1965 C. H. KRAMP ETAL 3,209,436
METHOD OF FUSING A CONTACT ONTO A SEMI-CONDUCTIVE BODY
Original Filed Jan. 23, 1959 4 Sheets-Sheet 3

INVENTOR
CARL HEINRICH KRAMP
HORST W. KUTSCHERA
BY
AGENT

Oct. 5, 1965 C. H. KRAMP ETAL 3,209,436
METHOD OF FUSING A CONTACT ONTO A SEMI-CONDUCTIVE BODY
Original Filed Jan. 23, 1959 4 Sheets-Sheet 4

INVENTOR
CARL HEINRICH KRAMP
HORST W. KUTSCHERA
BY
AGENT

United States Patent Office 3,209,436
Patented Oct. 5, 1965

3,209,436
METHOD OF FUSING A CONTACT ONTO A SEMI-CONDUCTIVE BODY
Carl Heinrich Kramp, Hamburg-Niendorf, and Horst W. Kutschera, Hamburg-Langenhorn, Germany, assignors to North American Philips Company, Inc., New York, N.Y., a corporation of Delaware
Continuation of application Ser. No. 788,562, Jan. 23, 1959. This application June 7, 1961, Ser. No. 115,484
Claims priority, application Germany, Feb. 22, 1958, P 20,194; Mar. 26, 1958, P 20,396
9 Claims. (Cl. 29—155.5)

The invention relates to a method of fusing a contact onto a semi-conductive body in a novel alloying jig. Such a semi-conductive body provided with at least one alloy contact may be used to construct semi-conductive electrode systems, for example transistors, diodes, photo-electric cells and the like. This application is a continuation of a prior application, Serial No. 788,562, filed January 23, 1959, now abandoned.

It has hitherto been common practice to alloy contacts to semi-conductors by positioning this body in an alloying jig, by placing a quantity of contact material on this body and by subsequent heating of the assembly in a furnace in vacuo or in a protective gas, until the contact material melted and alloyed with the body.

It is known that the adhesion may be improved by using a flux, for example hydrochloric acid gas. In spite of the use of such a flux there is frequently the disadvantage that the adhesion between the contact material and the semiconductor is not uniform, so that the transition between these parts assumes an irregular shape which differs from the initial semi-conductive surface.

It has been suggested to improve the formation of a more uniform shape by depositing a drop of the contact material on the semi-conductive body, so that the sealing would spread from the first point of contact in a uniform manner. With this method a curved transition was obtained. There has been known a device in which a drop of contact material was thrown on the semi-conductive surface.

The known devices to deposit a drop of contact material on the semi-conductive body comprises a furnace, through the wall of which are taken control-members or actuators in a vacuum-tight manner. Difficulties may thus arise owing to the high temperatures prevailing and with respect to an accurate maintenance of the vacuum or of the atmosphere in the furnace. Moreover, such systems are extremely complicated if they are to be suitable for alloying contacts on large numbers of semi-conductive bodies. Furthermore, these known systems have the disadvantage that the drop can be deposited on an accurately predetermined spot of the semi-conductive body only with great difficulty or not at all, which is important for the manufacture of transistors.

The invention has for its object, inter alia, to provide a method and a device to enable in a simple manner the deposition of at least one drop of contact material on a semi-conductive body, while precision control-members may be dispensed with. It has furthermore for its object to improve the formation of a flat transition or junction between this material and the body. The device employed may be arranged for alloying contacts on large numbers of semi-conductive bodies without involving complications. This device may, moreover, be constructed in a manner such that control-members taken through the wall of a furnace may be dispensed with. It is thus possible to arrange the contacts at an accurately determinable spot on a semi-conductive body, either on one side thereof or on two or more sides thereof.

In accordance with the invention, a semi-conductive body and at least one quantity of contact material are provided at relatively separate deposition areas of an alloying jig, wherein the deposition area for the contact material communicates by way of a duct with a deposition area for a semi-conductive body; then the alloying jig with its contents is heated in excess of the melting point of the contact material in a furnace and subsequently, the position of the alloying jig is changed so that at least a quantity of contact material flows out of a supply area through a duct onto the semi-conductive body.

The change of position may consist in tilting or turning-up of the alloying jig. Of course, as is common practice in this technique a plurality of such alloying jigs may be united to form a single piece, which will be termed hereinafter a multiple jig.

The jig may be such that one deposition area for a semi-conductive body communicates by way of ducts with more than one supply area's contact material. The quantities of contact material provided there may be caused to flow onto a semi-conductive body either by one or two or more changes of position.

The changes of position may be carried out in various ways. If a closed furnace is employed, the furnace may be tilted as a whole. If use is made of a tubular furnace, through the ends of which may be supplied and conducted away a protective gas, a support capable of tilting the alloying jig may be taken through such an end usually without involving complications. The change of position may be carried out in a particularly simple manner in a furnace comprising a conveyor belt, which has at least two different slopes, wherein the alloying jig is heated during the transport over one slope, in excess of the melting point of the contact material, and is tilted during the transition to the other slope, in a manner such that the material drops out of the deposition area.

As a matter of course, a plurality of simple or multiple jigs in a single furnace may be treated simultaneously or one after the other in the aforesaid manner.

The invention may be used for applying contacts to the conventional semi-conductors, for example germanium and silicon. The nature of these contacts, i.e. ohmic contacts or rectifying contacts, is not essential for the invention, although the invention is particularly suitable for the manufacture of such diodes and transistors in which two contacts are provided on opposite sides of the semiconductive body, since the use of the invention improves, inter alia, the formation of flat transitions or junctions, which are desired to obtain satisfactory semi-conductive devices. The use of the invention permits of providing two or more of these contacts on different sides of a semiconductive body without the need for removing the alloying jig from the furnace during the intervals between the process phases.

The contact material may consist of the conventional donors and/or acceptors or of alloys containing these elements.

The invention relates moreover to an alloying jig for the manufacture of semi-conductive devices, this jig comprising a deposition area for a semi-conductive body, and being characterized in that, in addition, one deposition area is provided for a quantity of contact material, this area communicating by way of a duct with the deposition area for the body in a manner such that, owing to a change in position of the jig, the material can flow through the duct to the body. The invention relates furthermore to furnaces for the manufacture of semi-conductive systems.

When carrying out the invention it is advantageous that the contact material and the semi-conductive material come into contact with each other not until the former has melted. Up to that instant they are exposed to the surrounding atmosphere, usually a protective gas, for example hydrogen, which is capable of cleaning the surfaces. If the protective gas has added to it a flux, for example, hydrochloric acid gas, this also has free access to the surfaces of the materials prior to sealing or fusion.

The invention will now be described more fully hereinafter with reference to a few embodiments, which are illustrated in the figures.

FIG. 8 is a perspective view of a multiple jig.

FIG. 9 is a diagrammatical sectional view of a furnace to be employed in accordance with the invention.

FIG. 10 is a diagrammatical sectional view of a tubular furnace.

FIG. 11 shows a support for a plurality of alloying jigs in perspective view.

Figure 1:
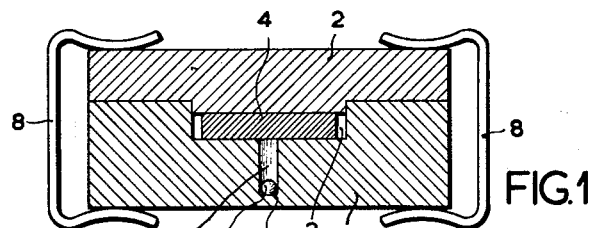
FIGS. 1 and 2 are sectional views of an alloying jig in two positions.
Figure 2:
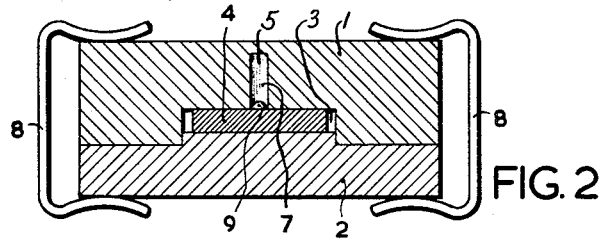

The alloying jig shown in FIGS. 1 and 2 comprises a block 1 of refractory material, for example graphite or oxidized ferrochromium, with a cover plate 2 of the same material. A deposition area 3 is provided with a plate of germanium 4. The jig has a second deposition area 5 for a quantity of contact material in the form of a pellet 6. The deposition area 5 for this pellet communicates by way of a duct 7 with the deposition area 3 of the semi-conductive body. The bottom 1 and the cover plate 2 of the jig are united by clips 8. The sectional view shows only a semi-conductive body and a quantity of contact material; as a rule, such a jig is united with a plurality of corresponding jigs to form a multiple jig in order to treat a considerably larger number of semi-conductive bodies, for example 20, which can be arranged in a row of deposition areas.

After the alloying jig has been heated in a furnace in excess of the melting point of the contact material 6, it is moved into the reversed position shown in FIG. 2. The pellet 6 thus drops on the semi-conductive body 3, alloys therewith and thus establishes a contact 9.

The semi-conductive body 4 can then be removed from the jig. Then further contacts may be provided in the same manner or in a different way so that the semi-conductive body is suitable for use in a diode, a transistor or, in general in a semi-conductive system.

Figure 3:
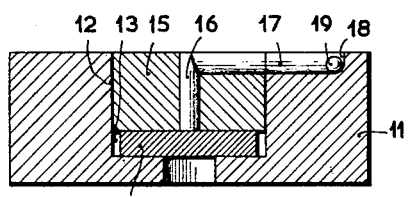
FIGS. 3 and 4 are sectional views of a different alloying jig also in two positions.

The jig shown in FIG. 3 is such that a small change in position is enough for the contact material to alloy. This jig consists of a block of refractory material 11 with a bore 12, of which the lower end constitutes a deposition area 13 for a semi-conductive body 14. On this body is positioned a plug 15, which has a bore 16 in the center, which communicates with a groove 17 in the upper surface of the plug 15 and in the block 11. This groove terminates in a deposition area 18 for the contact material 19. After heating this material in excess of the melting point, it is sufficient to tilt through an angle α (see FIG. 4) to drop the contact material onto the conductive body 14. In this jig the bore 16 and the groove 17 constitute the duct, which connects the deposition areas of the semi-conductive body and the contact material.

Figures 5, 6, 7:
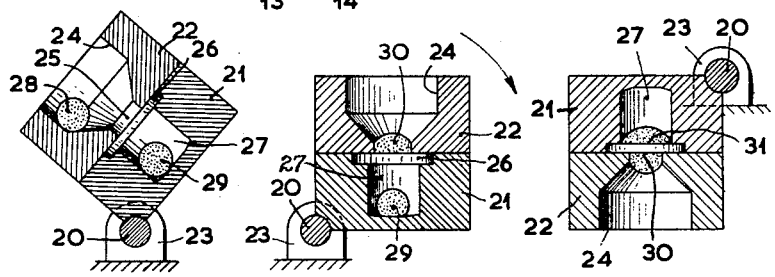
FIGS. 5, 6 and 7 are sectional views of an alloying jig to alloy contacts onto two sides of a semi-conductive body in three positions.

The jig shown in FIGS. 5, 6 and 7 is intended to provide a contact on two sides of a semi-conductive body. This alloying jig comprises a bottom 21, mounted on a shaft 20, and a cover plate 22, which is clamped to the bottom in a manner not shown. The shaft 20 is rotatable in one or more bearings 23. The cover plate 22 has a bore 24, which tapers towards the end to form a short duct 25, which opens out on top of a semi-conductive body 26, located in a deposition area provided in the bottom 21. This bottom has a second bore 27, which is covered by the said body 26.

The conical bore 24 constitutes a deposition area for a quantity of contact material 28; the bore 27 constitutes a deposition area for a second quantity of contact material 29. After the contact material 28 has melted, the jig 21, 22 is turned out of the position shown in FIG. 5 into the position shown in FIG. 6; the contact material drops onto the body 26 and forms a contact 30; after the material has alloyed, the adhesion is usually so great that the jig can be turned without any objection into the position shown in FIG. 7 in which the contact 30 is located below the semi-conductive body and the contact material 29 is also alloyed to the body and establishes a contact 31. It should be noted that, when using this alloying jig different temperatures may be chosen to alloy the contact materials; it is to be preferred, in this case, to establish first the contact which requires the highest alloy temperature. A simple method of tilting such a jig will be described with reference to the FIGS. 16 to 18.

The semi-conductive device obtained by using the jig shown in FIGS. 5 to 7 is excellently suitable for the manufacture of a transistor. In this case the materials 28 and 29 are chosen so that rectifying contacts 30 and 31 are established. An ohmic base connection may be provided afterwards on the body 26. As a matter of fact, the body 26 may be provided with the ohmic base connection already before it is introduced into the jig.

Figure 4:
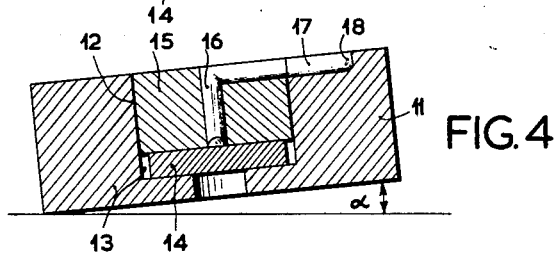

FIG. 8 shows a five-fold jig in a perspective view; in principle, this jig corresponds with the jig shown in FIGS. 3 and 4 in a sectional view. In this case, the jig is adapted to alloy two adjacent contacts on one side of the semi-conductive body. To this end each plug 15 has two bores 16 which communicate via a groove 17 with a deposition area for contact material 19. FIG. 8 shows therefore at the same time how a plurality of jigs to obtain a multiple mould can be united, to treat a series of semi-conductive bodies.

As a matter of course, many variants of the shape and the arrangement of the alloying jigs are possible within the scope of the invention. For example, on one side of a semi-conductor body two contacts and on the opposite side only one contact may be provided, by combining the principle illustrated in FIG. 8 with that shown in FIG. 5. On the top surface of the semi-conductive body two deposition areas 18 (see FIGS. 3 and 8) and on the bottom surface of the body a deposition area 27 (see FIG. 5) with the associated ducts are provided.

The method according to the invention may be carried out, for example, in a semi-stationary furnace 41 with a heating element 42, shown diagrammatically in FIG. 9. At an area 43 of this furnace a plurality of alloying jigs 44 are provided, the type of which may be that shown in FIGS. 3 or 8. After they have been heated at the required temperature the right-hand end of the furnace is lifted by means of a lever 45, so that the contact material drops on the semi-conductive bodies. It will be evident that it is thus possible to drop the contact material without any risk of contamination of the furnace contents.

A further furnace frequently used for the manufacture of semi-conductive devices is shown diagrammatically in FIG. 10. This furnace comprises a refractory tube 51, for example, of quartz, having a detachable end piece 52. The furnace can be heated by a coil 53; a protective gas can be supplied and conducted away through tubes 54. The jigs 55, which may be shaped in the form shown in FIGS. 5 to 7, however with the shafts 20 and bearings 21 shown in these figures, are fixed in a clamp 56, which is shown separately in FIG. 11. This clamp is supported by rods 57, which are taken through the ends of the furnace and closed locally by tube pieces 58 of plastic material.

The alloying jigs 55 can be tilted at the desired instant by turning the furnace 51 about its longitudinal axis or, as an alternative, supply by turning the rods 57 in their elastic packings 58.

Figure 12:
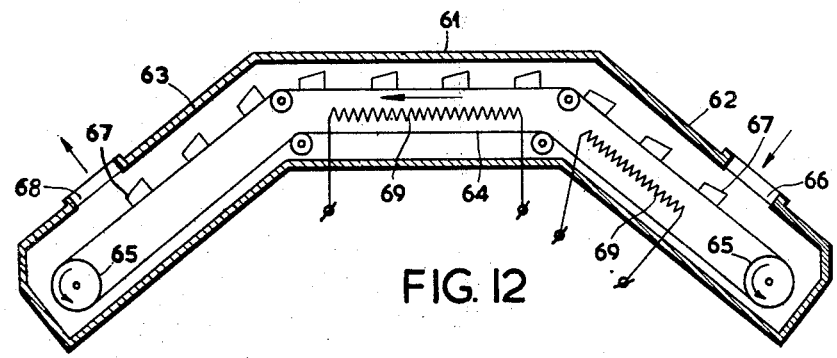
FIG. 12 is a diagrammatical sectional view of a furnace comprising a conveyor belt.

A third type of furnace, which is frequently used for the manufacture of semi-conductive devices, for example, transistors and diodes, is the so-called hump furnace. It is shown diagrammatically in FIG. 12. This furnace constitutes a tunnel furnace with a higher central portion 61 and two inclining ends 62 and 63. In the tunnel a conveyor belt 64 is moved slowly in the direction of the arrow over rollers 65. The tunnel portion 62 has an opening 66, through which jigs 67 can be positioned on the conveyor belt 64. After the jigs have passed through the furnace, they may be removed through an opening 68. The temperature in the furnace can be controlled by means of a plurality of heating elements 69. This furnace is termed "hump furnace" owing to its higher central portion 61, which permits of filling the furnace with a protective gas, for example, a mixture of nitrogen and hydrogen, which is lighter than air, without the risk of escaping of the gas through the openings 66 and 68, lying at a lower level. Consequently, this furnace permits an uninterrupted process.

The jigs may be arranged, for example, in occordance with the principle illustrated in FIGS. 3 and 4, in a manner such that the contact material 19 (see FIG. 3), as long as the jigs 67 are located on the sloping portion of the conveyor belt 64 in the tunnel end 62, remains in the deposition area 18. As soon as the jigs reach, however, the horizontal portion 61, they are tilted automatically and the contact material drops on the semi-conductive body.

This furnace may therefore be employed without any modification for the method according to the invention. The conveyor belt may form a larger number of slopes to cause the jigs to occupy three or more different positions.

In the embodiments shown the jigs are tilted each time about a usually imaginary axis. As a matter of fact, methods in which the jig is tilted for example about two axes at right angles to each other, are possible within the scope of the invention, in order to provide different quantities of contact material in order of succession on a semi-conductive body.

Figure 13:
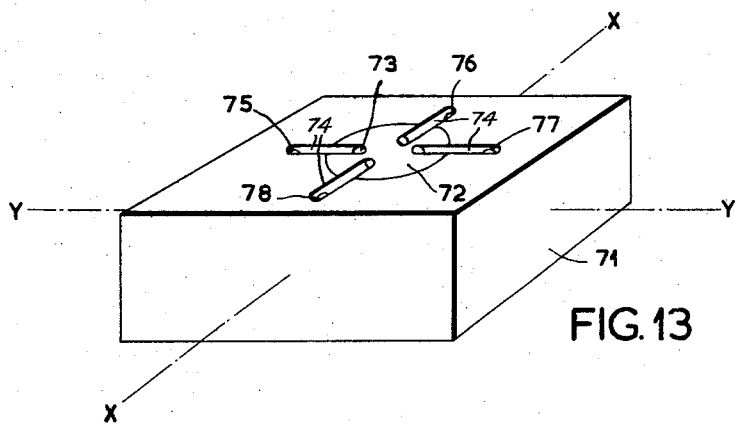
FIG. 13 is a perspective view of an alloying jig to alloy four contacts on one side of a semi-conductive body.

An example of such a jig is shown diagrammatically in FIG. 13. The alloy jig 71 corresponds in principle with the jig 11 shown in FIG. 3. The plug 72, however, has four bores 73 and in the upper surface four grooves 74 are provided, which terminate in deposition areas for quantities of contact material 75 to 78. By slightly tilting this jig about the axis X—X in two opposite directions, the quantities of contact material 75 and 77 may be caused to drop in succession into the bores 73, whereas the quantities 76 and 78 remain in place. After tilting the jig about the axis Y—Y also in two opposite directions, the last-mentioned quantities may also be introduced into the bores.

In the embodiments shown in FIGS. 1 to 7 the contact material is applied each time to a flat side of a semi-conductive body by way of a duct, which opens out in a direction at right angles to the said side. Also in this respect variants are possible within the scope of the invention.

Figure 14:
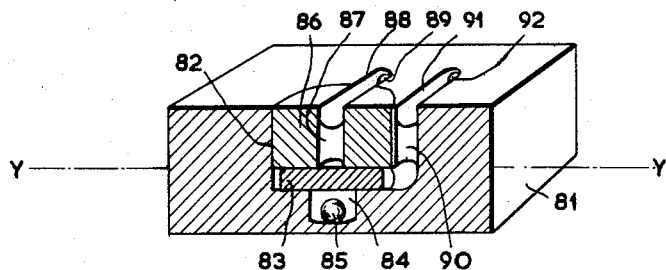
FIGS. 14 and 15 are partial sectional views and partial perspective views of two further embodiments of alloying jigs.

FIG. 14 shows an alloying jig in which the principles illustrated in FIGS. 3 and 5 are combined. It comprises a block of refractory material 81 with a bore 82, on the bottom of which lies a semi-conductive body 83. Below this body provision is made of a deposition area 84 for a quantity of contact material 85. Into the bore 82 is introduced a plug 86. A bore 87 and a groove 88 constitute a duct, which conducts to a deposition area for contact material 89. At the side of the bore 82 the block 81 has a second bore 90, which bends over at the lower end and opens out opposite the side edge of the semi-conductive body 83. The bore 90 with a groove 91 constitutes a duct, which leads to a deposition area for a quantity of contact material 92. By slightly tilting this jig forwardly about the axis Y—Y, the quantities of contact material 89 and 92 establish contacts in the center of the top surface of the semi-conductive body and on the side edge of this body respectively. The contact materials 85 and 89 may be chosen so that they constitute rectifying contacts, which may be connected in succession as a collector and an emitter, whereas the material 92 constitutes an ohmic base contact.

It has been stated that it is possible to shape a jig so that two or more deposition areas for contact material communicate with a deposition area for a semi-conductive body by way of ducts, which open out at one given spot in the last-mentioned deposition area.

Figure 15:
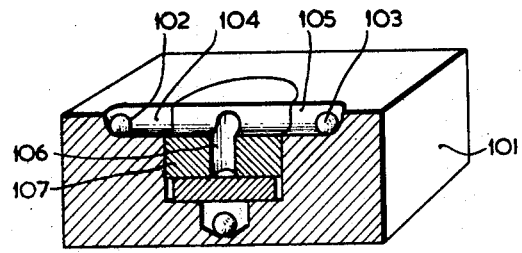

Such a jig is shown in FIG. 15. It corresponds in many respects, which are not further described, with the jig shown in FIG. 14. In the upper surface of the block 101 provision is made of two deposition areas for contact materials 102 and 103, which communicate by way of grooves 104 and 105 respectively with a bore 106 in the plug 107.

The areas may be provided with quantities of contact material of different compositions, which are alloyed in order of succession at the same spot of the semi-conductive body. It is known to alloy contacts which contain different active impurities (acceptors and donors), which exhibit, moreover, great differences with respect to diffusion velocity in the semi-conductive body. By providing each of these active impurities in a separate quantity of contact material, different alloy temperatures and alloy periods may be adjusted for these impurities.

This method may be used with advantage to alloy aluminum-containing contacts, since it has been found that an aluminum-containing alloy can be alloyed with greater difficulty only with a semi-conductive body, for example, a germanium crystal, than it can be alloyed with a crystal already alloyed with such a body.

An aluminum-containing contact may be alloyed by means of the alloying jig shown in FIG. 15 by guiding first a quantity of contact material alloying satisfactorily with the semi-conductive body out of a deposition area to the body, by tilting the jig in one direction. This contact material consists, for example, of bismuth, which is alloyed at 600° C. in hydrogen. The other deposition area contains an alloy of bismuth with 3% by weight of aluminum.

The temperature is then raised to 750° C. after which the second quantity of contact material is applied to the first quantity, by tilting the jig in the other direction. The aluminum will spread through the whole contact and, subsequent to cooling in known manner, it will constitute a segregated semi-conductive layer of the p-type.

The advantage of the methods according to the invention becomes manifest in these cases in that the different quantities of contact material can be alloyed at the same spot of the semi-conductive body without difficulties and without the need for removing the jig from the furnace.

In order to obtain by a comparatively small variation in the position of the surface supporting a jig, larger variations in the position of the jig, use may be made of a jig which is moved via an unstable position from one stable position into a further stable position.

Figure 16:
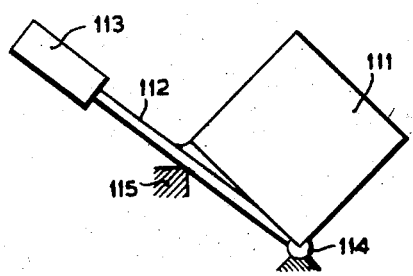
FIGS. 16, 17 and 18 show diagrammatically an alloying jig in three different positions.
Figure 17:
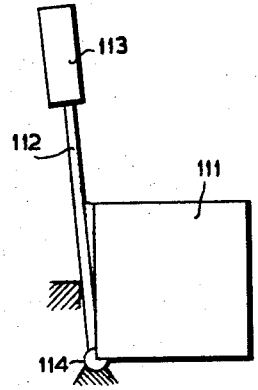
Figure 18:
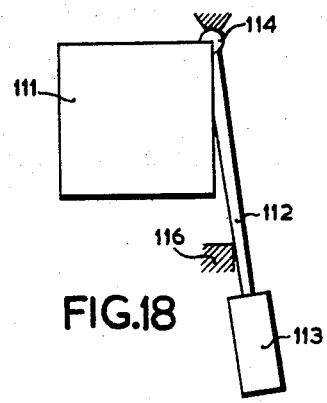

The FIGS. 16 to 18 show how a jig 111, which may correspond with the type shown in FIGS. 5 to 7, can be provided with an arm 112 with a weight 113. The assembly is rotatable about a shaft 114. In the position shown in FIG. 16 the arm 112 bears on a lug 115, united with the supporting surface (not shown). In this position the jig is heated until the contact material melts.

Then the assembly is tilted into the position shown in FIG. 17, which is still stable, a quantity of contact material can then flow onto the semi-conductive body. By tilting slightly further the supporting surface, the jig is moved through an unstable position, so that it is completely tilted in the position shown in FIG. 18, where contact material can drop for example, on the other side of the body. In this position the arm 112 bears on a further lug 116.

What is claimed is:

1. A method of alloying an electrode contact to a semi-conductive body, comprising the steps of providing the body and a pellet of contact material both in solid form in communicating spaced apertures of a holding jig comprised of members maintained in fixed spatial relationship, which apertures are connected by way of a material-carrying duct, heating the jig with the body and pellet to melt the pellet and heat the body while separated in a protective atmosphere which cleans their surfaces, and thereafter tilting the entire jig without disturbing the fixed spatial relation of its members causing the molten pellet material to flow via the duct onto and alloy to the body.

2. A method of alloying an electrode contact to a semi-conductive body, comprising the steps of providing the body and a mass of contact material both in solid form in communicating spaced apertures of a holding jig comprised of members maintained in fixed spatial relation, said apertures being connected by way of a material-carrying duct free of bodily impediments, maintaining the jig in a first position in which the said body and mass are stably retained in their respective apertures in spaced apart relationship, heating the jig at a temperature above the melting point of the mass but below that of the body to melt the mass and heat the body while separated in a protective atmosphere which cleans their surfaces, thereafter tilting the entire jig without disturbing the fixed spatial relation of its members to a second position in which only the said molten mass of contact material becomes unstable causing all of it to flow instantly along the duct and fall onto and alloy to the solid body, and thereafter cooling the jig to freeze the mass on the body forming an alloyed electrode contact to the said semi-conductive body.

3. A method of alloying an electrode contact to a desired area of a semi-conductive body, comprising the steps of providing the body and a mass of low-melting point contact material both in solid form in communicating spaced apertures of a holding jig comprised of members maintained in fixed spatial relation, said apertures being fully exposed to the atmosphere and being connected by way of a material-carrying duct free of bodily impediments and leading to the said desired area, maintaining the jig in a first position in which the said body and mass are stably retained in their respective apertures in spaced apart relationship, heating the jig at a temperature above the melting point of the mass but below that of the body to melt the mass and heat the body while separated in a protective atmosphere which is fully accessible to the mass and body and which cleans their surfaces, thereafter tilting the entire jig without disturbing the fixed spatial relation of its members to a second position in which only the said molten mass of contact material becomes unstable causing all of it to flow instantly along the duct and fall onto and alloy to the said desired area of the solid body, and thereafter cooling the jig to freeze the mass on the body forming an alloyed electrode contact at the said desired area to the said semi-conductive body.

4. A method of alloying an electrode contact to a semi-conductive body, comprising the steps of providing the body and a mass of contact material both in solid form in communicating spaced apertures of a holding jig comprised of members maintained in fixed spatial relation, said apertures being connected by way of a material-carrying duct free of bodily impediments, placing the said jig within a furnace and providing a protective atmosphere within the furnace, maintaining the jig while within the furnace in a first position in which the said body and mass are stably retained in their respective apertures in spaced apart relationship, heating the jig at a temperature above the melting point of the mass but below that of the body to melt the mass and heat the body while separated in the said protective atmosphere which cleans their surfaces, thereafter tilting the entire jig while within the furnace without disturbing the fixed spatial relation of its members to a second position in which only the said molten mass of contact material becomes unstable causing all of it to flow instantly along the duct and fall onto and alloy to the solid body, and thereafter cooling the jig to freeze the mass on the body forming an alloyed electrode contact to the said semi-conductive body.

5. A method as set forth in claim 4 wherein the jig is tilted by tilting the entire furnace containing the jig.

6. A method as set forth in claim 4 wherein the jig is tilted by rotating the entire furnace containing the jig.

7. A method of alloying an electrode contact to each of plural semi-conductive body portions, comprising the steps of providing the body portions each with an associated mass of contact material both in solid form in communicating spaced apertures of a multiple holding jig comprised of members maintained in fixed spatial relation, said spaced apertures for each body portion being connected by way of a material-carrying duct free of bodily impediments, providing the entire jig within a furnace and maintaining it in a first position in which each of the said body portions and their associated mass are stably retained in their respective apertures in spaced apart relationship, heating the jig within the furnace at a temperature above the melting point of the masses but below that of the body portions to melt each mass and heat the body portions while separated in a protective atmosphere which cleans their surfaces, thereafter while still within the furnace tilting the entire jig without disturbing the fixed spatial relation of its members to a second position wherein only each said molten mass of contact material becomes unstable causing it to flow instantly along its duct and fall onto and alloy to its associated body portion, and thereafter cooling the jig to freeze each mass on the associated body portion forming alloyed electrode contacts to each of the said semi-conductive body portions.

8. A method as set forth in claim 7 wherein the jig is tilted by tilting the entire furnace.

9. A method as set forth in claim 7 wherein the jig is conveyed through the furnace while being heated, and wherein the jig is conveyed in a first direction to maintain its first position and is conveyed in a second different direction to establish the said second position.

References Cited by the Examiner

UNITED STATES PATENTS

| 1,574,598 | 2/26 | Bowles | 22—57.1 |
|---|---|---|---|
| 2,648,167 | 8/53 | Ellwood | 29—203 |
| 2,756,483 | 7/56 | Wood | 29—25.3 |
| 2,857,296 | 10/58 | Farris | 148—1.5 |
| 2,862,840 | 12/58 | Kordalewski | 29—25.3 |
| 2,881,103 | 4/59 | Brand et al. | 148—1.5 |
| 2,897,555 | 8/59 | Nishikiori | 22—79 XR |

FOREIGN PATENTS 482,041  9/29  Germany.

RICHARD H. EANES, Jr., *Primary Examiner.*

LEON PEAR, WHITMORE A. WILTZ, *Examiners.*

UNITED STATES PATENT OFFICE
CERTIFICATE OF CORRECTION

Patent No. 3,209,436 October 5, 1965

Carl Heinrich Kramp et al.

It is hereby certified that error appears in the above numbered patent requiring correction and that the said Letters Patent should read as corrected below.

Column 3, line 69, for "conductive" read -- semi-conductive --; column 4, line 48, for "semi-conductor" read -- semi-conductive --; column 5, line 7, for "supply" read -- simply --.

Signed and sealed this 3rd day of May 1966.

(SEAL)
Attest:

ERNEST W. SWIDER
Attesting Officer

EDWARD J. BRENNER
Commissioner of Patents